(12) United States Patent
Higashimata et al.

(10) Patent No.: US 7,346,442 B2
(45) Date of Patent: Mar. 18, 2008

(54) LOCKUP CONTROL OF TORQUE CONVERTER

(75) Inventors: Akira Higashimata, Hadano (JP); Satoshi Segawa, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 472 days.

(21) Appl. No.: 11/147,440

(22) Filed: Jun. 8, 2005

(65) Prior Publication Data

US 2005/0278103 A1 Dec. 15, 2005

(30) Foreign Application Priority Data

Jun. 9, 2004 (JP) ............................. 2004-170994

(51) Int. Cl.
*G06F 7/00* (2006.01)
*G06F 17/00* (2006.01)
*G06F 19/00* (2006.01)

(52) U.S. Cl. ........................... 701/67; 701/701; 701/68
(58) Field of Classification Search ............. 701/67–58
See application file for complete search history.

(56) References Cited

FOREIGN PATENT DOCUMENTS

JP 2002-130463 A 5/2002

OTHER PUBLICATIONS

Computer control systems for automotive power trains, Hrovat, D.; Powers, W.F.; Control Systems Magazine, IEEE vol. 8, Issue 4, Aug. 1988 pp. 3-10, Digital Object Identifier 10.1109/37.7724.*

Optimal control techniques for assessing feasibility and defining subsystem level requirements: an automotive case study Kolmanovsky, I.V.; Stefanopoulou, A.G.; Control Systems Technology, IEEE Transactions on, vol. 9, Issue 3, May 2001 pp. 524-534, Digital Object Identifier 10.1109/87.918904.*

Nonlinear air-to-fuel ratio and engine speed control for hybrid vehicles, Wagner, J.R.; Dawson, D.M.; Liu Zeyu; Vehicular Technology, IEEE Transactions on, vol. 52, Issue 1, Jan. 2003 pp. 184-195, Digital Object Identifier 10.1109/TVT.2002.807156.*

Analysis of the dynamics of a wind-turbine water-pumping system, Muljadi, E., ; Nix, G.; Bialasiewicz, J.T.; Power Engineering Society Summer Meeting, 2000. IEEE, vol. 4, Jul. 16-20, 2000 pp. 2506-2519 vol. 4 Digital Object Identifier 10.1109/PESS.2000. 867385.*

(Continued)

*Primary Examiner*—Cuong Nguyen
(74) *Attorney, Agent, or Firm*—Foley & Lardner LLP

(57) ABSTRACT

A controller (5) controls the engaging force between a pump impeller (1a) connected to an engine (2) and a turbine runner (1b) connected to an automatic transmission (23). The controller (5) first performs feedforward control of the engaging force. The controller (5) determines a reference value and a target rotation speed based on the capacity characteristics of the torque converter (1), and if the rotation speed of the engine (2) becomes less than the reference value, performs feedback control of the engaging force so that the deviation between the target rotation speed and the rotation speed decreases. When a predetermined condition is satisfied, the controller (5) changes over from feedforward control to feedback control, even if the rotation speed of the engine (21) is not less than the reference value. As a result, the control precision of feedback control when performing a slip lock-up, is increased.

10 Claims, 12 Drawing Sheets

OTHER PUBLICATIONS

Installation of a hydraulic kiln drive to eliminate a resonant vibration problem, Standen, J.A.; Cement Industry Technical Conference, 1996. XXXVIII Conference Record., IEEE/PCA, Apr. 14-18, 1996 pp. 35-43 Digital Object Identifier 10.1109/CITCON.1996.506011.*

Analytic and experimental study on fast response MR-fluid actuator, Takesue, N.; Furusho, J.; Kiyota, Y.; Robotics and Automation, 2003. Proceedings. ICRA '03. IEEE International Conference on vol. 1, Sep. 14-19, 2003 pp. 202-207 vol. 1.*

Performance prediction and test of adjustable, permanent-magnet, load transmission systems, Wallace, A.; von Jouanne, A.; Williamson, S.; Smith, A.;Industry Applications Conference, 2001. Thirty-Sixth IAS Annual Meeting. Conference Record of the 2001 IEEE, vol. 3, Sep. 30-Oct. 4, 2001 pp. 1648-1655 vol. 3, Digital Object Identifier 10.1109/I.*

Force display system using particle-type electrorheological fluids, Sakaguchi, M.; Furusho, J.; Robotics and Automation, 1998. Proceedings. 1998 IEEE International Conference on, Vol. 3, May 16-20, 1998 pp. 2586-2591 vol. 3, Digital Object Identifier 10.1109/ROBOT.1998.680731.*

Development of ER actuators and their applications to force display systems, Sakaguchi, M.; Furusho, J.; Virtual Reality Annual International Symposium, 1998. Proceedings IEEE 1998, Mar. 14-18, 1998 pp. 66-70, Digital Object Identifier 10.1109/VRAIS.1998.658424.*

* cited by examiner

LOCKUP CONTROL OF TORQUE CONVERTER

FIELD OF THE INVENTION

This invention relates to control of the engaging force of a lockup clutch used with a torque converter for vehicles.

BACKGROUND OF THE INVENTION

A torque converter interposed between a vehicle engine and an automatic transmission transmits torque between a pump impeller and a turbine runner via a fluid. The relative rotation of the pump impeller to the turbine runner increases engine fuel consumption, so after the vehicle has started, the pump impeller and turbine runner are preferably connected together via a lockup clutch as soon as possible.

In a torque converter provided with a lockup clutch, a change-over between a converter mode which transmits torque via the fluid and a lockup mode which transmits torque via the lockup clutch is performed via a slip mode which permits a slip of the lockup clutch so that part of the torque is transmitted via the fluid, and the remainder of the torque is transmitted via the lockup clutch.

SUMMARY OF THE INVENTION

In JP2002-130463A published by the Japan Patent Office in 2002, in the slip mode which changes over from the converter mode to the lockup mode, a lockup differential pressure is first increased by feedforward control. The lockup differential pressure is the differential pressure between the engaging pressure and the release pressure of the lockup clutch.

If a real slip rotation speed $\omega_{SLPR}$ is less than a change-over slip rotation speed $\omega_{SLPTF}$, there will be a change-over to the slip mode. In the slip mode, the lockup differential pressure is feedback-controlled so that the real slip rotation speed $\omega_{SLPR}$ coincides with a target slip rotation speed $\omega_{SLPT0}$.

In the slip mode, if the slip rotation speed $\omega_{SLPR}$ is changed over and is less than a second change-over slip rotation speed smaller than the slip rotation speed $\omega_{SLPTF}$, the clutch will enter the lockup mode.

The slip rotation speed means the relative rotation speed or rotation speed difference of the pump impeller and turbine runner. As the rotation speed of the pump impeller is the same as the engine rotation speed, this may also mean the relative rotation speed or rotation speed difference of the engine and turbine runner. The change-over slip rotation speed $\omega_{SLPTF}$ is set based on a ratio $\alpha$ ($0<\alpha<1$) of the real slip rotation speed $\omega_{SLPR}$ and target slip rotation speed $\omega_{SLPT0}$.

According to the Inventors' research, a capacity characteristic of the torque converter is as shown in FIG. 7. As shown in this figure, a speed ratio e and a capacity coefficient C of the torque converter have a nonlinear relation in the low speed ratio region, and a linear relation in the high speed ratio region. The speed ratio is also referred to as the ratio of the turbine runner rotation speed to the engine rotation speed. Since the engine rotation speed is the same as the rotation speed of the pump impeller, the ratio of the turbine runner rotation speed to the pump impeller rotation speed may also be referred to as a speed ratio. The speed ratio which is the boundary of the nonlinear region and linear region is referred to as a boundary speed ratio. In general, the boundary speed ratio is of the order of 0.8. Regarding the relation between the speed ratio e and the capacity coefficient C of the torque converter, the speed ratio is nonlinear in the region 0-0.8, and linear in the region 0.8-1.0. The nonlinear region includes the state where the turbine runner rotation speed of the automatic transmission is in the low rotation speed region and increasing. When the feedback control in the slip mode is performed in such a state, control performance may worsen depending on the integration characteristic of the controller, and the engine may stall. If the lockup clutch is immediately released in order to avoid an engine stall, a shock will then occur. Hence, it is usually desired to limit the slip mode which performs feedback control to the linear region.

In the aforesaid prior art, when the real slip rotation speed $\omega_{SLPR}$ becomes equal to or less than the change-over slip rotation speed $\omega_{SLPTF}$, there is a change-over to the slip mode.

This change-over slip rotation speed $\omega_{SLPTF}$ is specified as follows:

$$\omega_{SLPTF} = (1-\alpha)\omega_{SLPT0} + \alpha\omega_{SLPR}$$

However, since it is not known whether or not the slip mode is applied in the linear region in this specification, it is difficult to control the slip rotation speed with high precision.

It is therefore an object of this invention to improve the control precision of slip rotation speed in the slip mode.

In order to achieve the above object, this invention provides a lockup control device of a lockup clutch of a torque converter for a vehicle. The torque converter comprises a pump impeller connected to an engine and a turbine runner connected to an automatic transmission, and transmits a torque therebetween via a fluid and via the lockup clutch according to an engaging force of the lockup clutch. The lockup control device comprises a mechanism which adjusts the engaging force and a programmable controller. The programmable controller is programmed to perform feedforward control of the mechanism, calculate a target engine rotation speed based on a running state of the engine, compute a reference value related to a rotation speed of the engine based a capacity characteristic of the torque converter, perform, when the rotation speed of the engine falls to less than the reference value during feedforward control, a change-over from feedforward control of the mechanism to feedback control of the mechanism in which a deviation of the rotation speed of the engine from the target engine rotation speed is reduced, and perform, when a predetermined condition is satisfied, even if the rotation speed of the engine has not fallen to less than the reference value, a change-over from feedforward control of the mechanism to feedback control of the mechanism.

This invention also provides a lockup control method of the lockup clutch comprising performing feedforward control of the mechanism, calculating a target engine rotation speed based on a running state of the engine, computing a reference value related to a rotation speed of the engine based on a capacity characteristic of the torque converter, performing, when the rotation speed of the engine falls to less than the reference value during feedforward control, a change-over from feedforward control of the mechanism to feedback control of the mechanism in which the deviation of the rotation speed of the engine from the target engine rotation speed is reduced, and performing, when a predetermined condition is satisfied, even if the rotation speed of the engine has not fallen to less than the reference value, a change-over from feedforward control of the mechanism to feedback control of the mechanism.

The details as well as other features and advantages of this invention are set forth in the remainder of the specification and are shown in the accompanying drawings.

DESCRIPTION OF THE PREFERRED EMBODIMENTS

Figure 1:
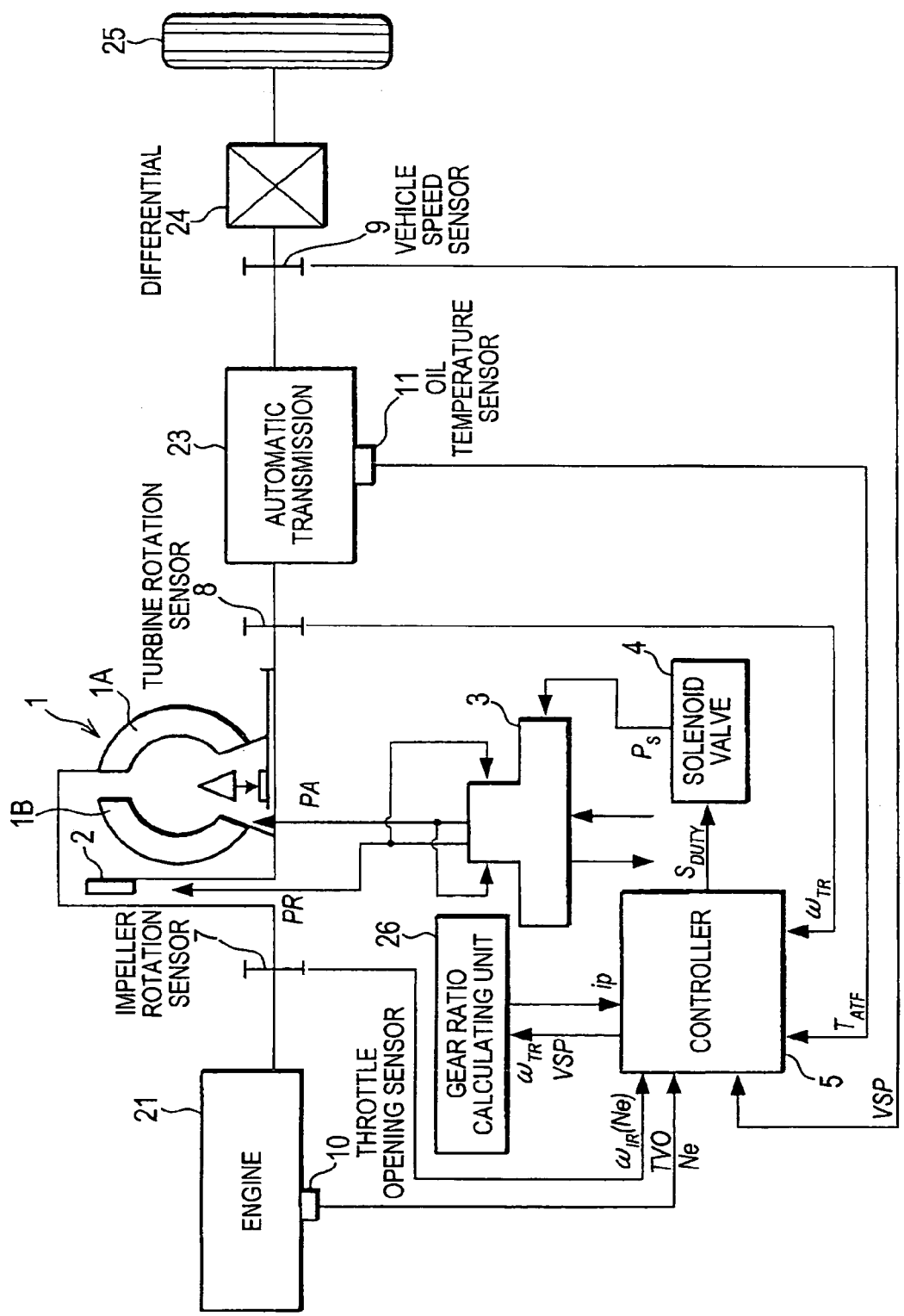
FIG. 1 is a schematic diagram of a power train of a vehicle provided with a lockup clutch to which this invention is applied.

Referring to FIG. 1 of the drawings, a multicylinder engine 21 for vehicles is connected to an automatic transmission 23 via a torque converter 1, and the output torque of the automatic transmission 23 is transmitted to drive wheels 25 via a differential 24. The automatic transmission 23 comprises a continuously variable transmission.

The torque converter 1 is provided with a pump impeller 1A driven by the engine 21, a turbine runner 1B joined to the input shaft of the automatic transmission 23, and a lockup clutch 2 which directly connects the turbine runner 1B to the pump impeller 1A.

The engaging force of the lockup clutch 2 varies according to a differential pressure (PA−PR) between an apply pressure PA and a release pressure PR.

When the apply pressure PA is smaller than the release pressure PR, the lockup clutch 2 is in a release state, and the pump impeller 1A and turbine runner 1B transmit torque via a fluid interposed therebetween.

When the apply pressure PA is larger than the release pressure PR, the lockup clutch 2 engages due to the engaging force according to the differential pressure (PA−PR).

When the differential pressure (PA−PR) is small, the pump impeller 1A and turbine runner 1B transmit torque according to the engaging force while performing relative rotation due to slip.

When the differential pressure (PA−PR) is larger than a set value, the pump impeller 1A and turbine runner 1B are in a direct connection state without relative rotation, or so-called "lockup state".

In the state where the differential pressure (PA−PR) is not larger than the set value, and relative rotation is still possible, the torque converter 1 transmits torque via two routes, i.e., torque transmitted via the fluid, and torque transmitted due to mechanical transmission by the lockup clutch 2. In this state, the engine output torque is equal to the sum total of these torques.

Therefore, the torque transmitted via the lockup clutch 2 can be calculated by subtracting the fluid transmission torque from the engine output torque. In the following description, the transmission torque of the lockup clutch 2 is referred to as the engaging capacity of the lockup clutch 2.

The engaging capacity of the lockup clutch 2 is controlled by a control device provided with a slip control valve 3, solenoid valve 4 and gear ratio calculation unit 26.

Figure 2:
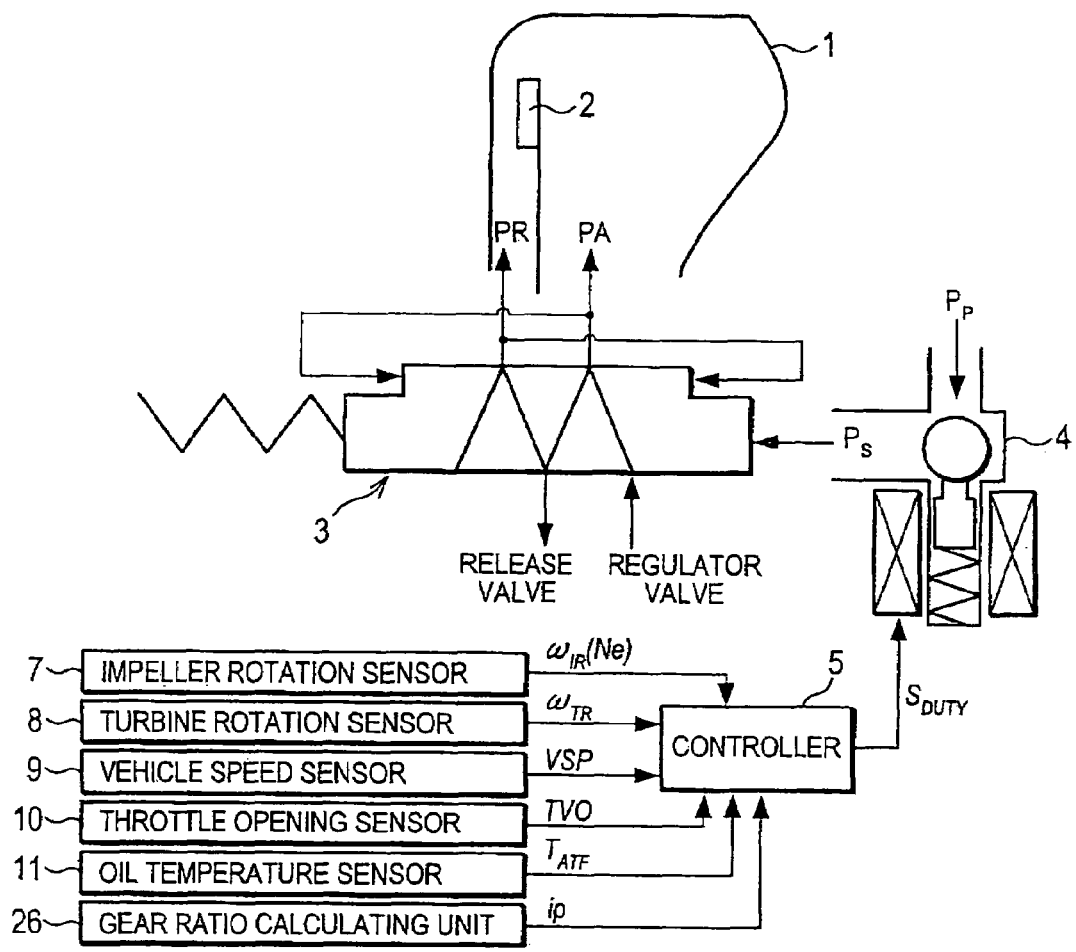
FIG. 2 is a schematic diagram of a lockup control device according to this invention.

Referring to FIG. 2, the control valve 3 supplies the apply pressure PA and release pressure PR to the lockup clutch 2 according to a signal pressure Ps inputted from the solenoid valve 4. The control valve 3 changes the differential pressure of the apply pressure PA and release pressure PR, i.e., the engaging capacity of lockup clutch 2, according to the signal pressure Ps.

The solenoid valve 4 adjusts the pump pressure Pp which the oil pressure source supplies to the signal pressure Ps by operation of the solenoid according to a duty signal $S_{DUTY}$. The duty signal $S_{DUTY}$ is outputted by the controller 5.

The controller 5 comprises a microcomputer provided with a central processing unit (CPU), read-only memory (ROM), random access memory (RAM) and input/output interface (I/O interface). The controller may comprise plural microcomputers.

The controller 5 controls the differential pressure (PA−PR) applied to the lockup clutch 2 according to a mode corresponding to one of a converter mode, a slip mode and a lockup mode.

In the first half of the slip mode, the controller 5 performs feedforward control of the differential pressure (PA−PR). In the second half of the slip mode, feedback/feedforward control of the differential pressure (PA−PR) is performed. The controller 5 performs this differential pressure control by outputting the duty signal $S_{DUTY}$ to the solenoid valve 4.

In order to generate the duty signal $S_{DUTY}$, signals are input to the controller 5 respectively from a throttle position sensor 10 which detects a throttle valve opening TVO of the engine 1, an impeller rotation sensor 7 which detects a rotation speed $\omega_{IR}$ of the pump impeller 1A, a turbine rotation sensor 8 which detects a rotation speed $\omega_{TR}$ of the turbine runner 1B, an oil temperature sensor 11 which detects an oil temperature $T_{ATF}$ of the automatic transmission 23, and a vehicle speed sensor 9 which detects a vehicle speed VSP. A signal which shows the calculation result of a gear ratio calculation unit 26 is also input to the controller 5. Since the pump impeller 1A is directly connected to the engine 21, the rotation speed $\omega_{IR}$ of the pump impeller 1A is used also as a rotation speed Ne of the engine 21.

From the rotation speed $\omega_{TR}$ of the turbine runner 1B and vehicle speed VSP, the gear ratio calculation unit 26 calculates a real speed ratio ip of the automatic transmission 3, and inputs it to the controller 5. The gear ratio calculation unit 26 comprises the same type of microcomputer as that of the controller 5. The gear ratio calculation unit 26 and controller 5 may be constituted by the same microcomputer.

Next, referring to FIG. 3, the feedback/feedforward control of the differential pressure (PA−PR) performed by the controller 5, will be described. The blocks shown in this figure denote functions of the controller 5 as virtual units, and do not exist physically.

A target slip rotation speed calculation unit 100 calculates a target slip rotation speed $\omega_{SLPT}$ of the pump impeller 1A and turbine runner 1B based on the vehicle speed VSP, throttle valve opening TVO, gear ratio ip and oil temperature $T_{ATF}$. The target slip rotation speed $\omega_{SLPT}$ is a slip rotation speed which can suppress noise pulses due to fluctuations in the combustion of the engine 21 to the minimum, and minimize noise pulses emitted by the drive train. The target slip rotation speed $\omega_{SLPT}$ is defined experimentally beforehand using the aforesaid parameters.

A pre-compensation unit 101 calculates a first target slip rotation speed basic compensation value $\omega_{SLPTC0}$ and a second target slip rotation speed compensation value $\omega_{SLPTC2}$ by processing the target slip rotation speed $\omega_{SLPT}$ with a compensation filter so that the target slip rotation speed $\omega_{SLPT}$ varies with a desired response.

The pre-compensation unit 101 comprises a pre-compensator 101A and a feedforward compensator 101B. The pre-compensator 101A calculates the first target slip rotation speed basic compensation value $\omega_{SLPTC0}$ by the following equation (1):

$$\omega_{SLPTC0} = G_R(s) \cdot \omega_{SLPT}(t) \quad (1)$$

$G_R(s)$: transfer function of pre-compensator.

The feedforward compensator 101B calculates the second target slip rotation speed compensation value $\omega_{SLPTC2}$ by the following equation (2):

$$\omega_{SLPTC2} = G_M(s) \cdot \omega_{SLPT}(t) \quad (2)$$

$G_M(s)$: transmission function of reference model.

A dead time processing unit 111 calculates a first target slip rotation speed compensation value $\omega_{SLPTC1}$ by the following equation (3):

$$\omega_{SLPTC1} = e^{-Ls} \cdot \omega_{SLPTC0} \quad (3)$$

$e^{-Ls}$: dead time of lockup mechanism.

A real slip rotation speed calculation unit 103 calculates a real slip rotation speed $\omega_{SLPR}$ of the torque converter 1 by subtracting the rotation speed $\omega_{TR}$ of the turbine runner 1B from the rotation speed $\omega_{IR}$ of the pump impeller 1A. Here, the rotation speed of the pump impeller 1A is equal to the rotation speed of the engine 21, and the rotation speed of the turbine runner 1B is equal to the input rotation speed of the automatic transmission 23.

A rotation deviation calculation unit 102 calculates a deviation $\omega_{SLPER}$ between the first target slip rotation speed compensation value $\omega_{SLPTC1}$ and real slip rotation speed $\omega_{SLPR}$ by the following equation (4):

$$\omega_{SLPER} = \omega_{SLPTC1} - \omega_{SLPR} \quad (4)$$

A feedback compensation unit 104 calculates a first slip rotation speed command value $\omega_{SLPC1}$ by the following equation (5) based on the deviation $\omega_{SLPER}$:

$$\omega_{SLPC1} = G_{CNT}(s) \cdot \omega_{SLPER} = K_p \cdot \omega_{SLPER} + \frac{K_i}{s} \cdot \omega_{SLPER} \quad (5)$$

$G_{CNT}(s)$: transfer function of feedback compensation device,
$K_p$: proportional gain,
$K_i$: integral gain,
s: differential operator.

The feedback compensation unit 104 also adds the second target slip rotation speed compensation value $\omega_{SLPTC2}$ to the first slip rotation speed command value $\omega_{SLPC1}$ by the following equation (6) to calculate a slip rotation speed command value $\omega_{SLPC}$.

$$\omega_{SLPC} = \omega_{SLPC1} + \omega_{SLPTC2} \quad (6)$$

Figure 4:
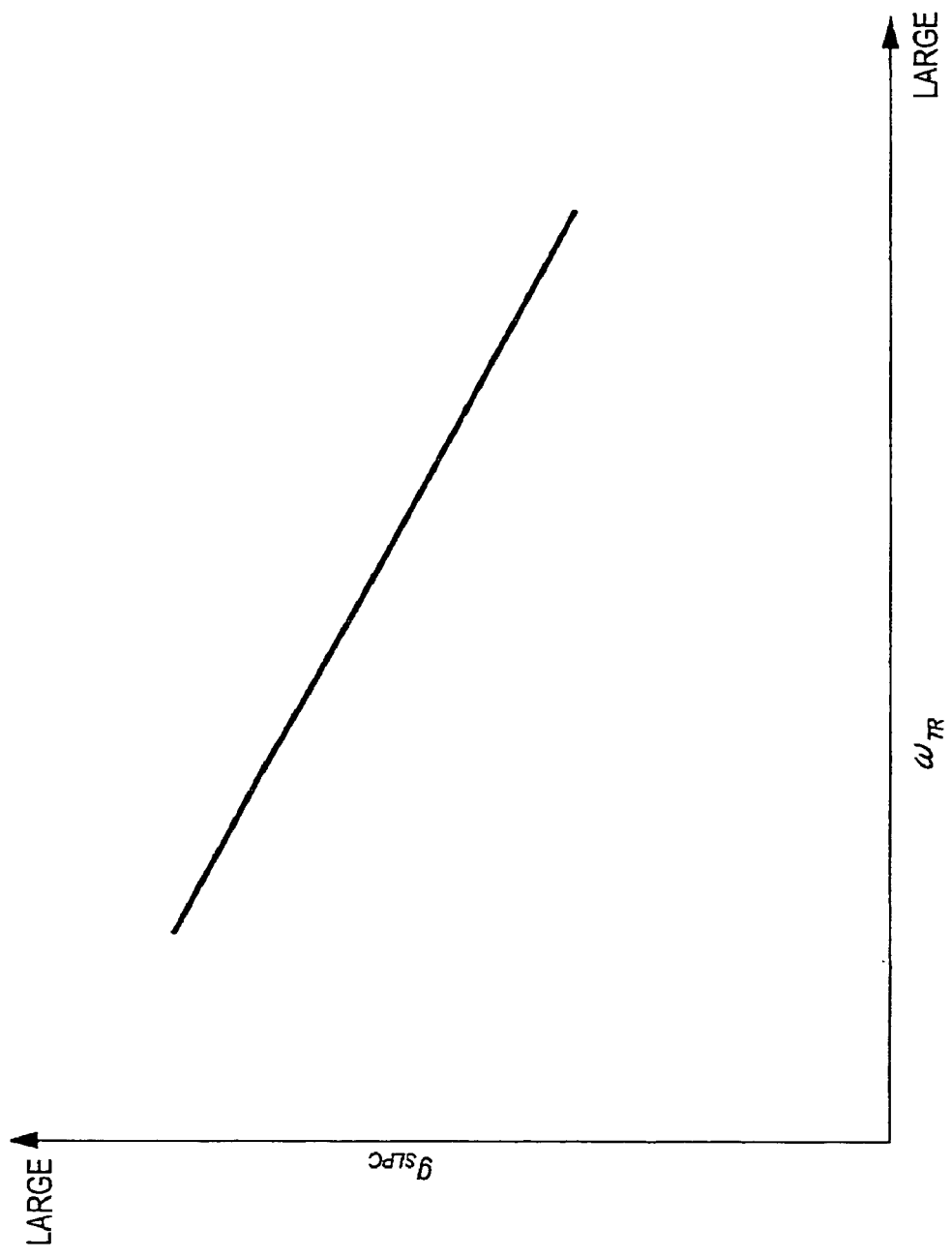
FIG. 4 is a diagram stored by the controller which shows the characteristics of a map of a relative rotation speed gain $g_{SLPC}$.

A slip rotation gain calculation unit 106 calculates a slip rotation gain $g_{SLPC}$ from the rotation speed $\omega_{TR}$ of the turbine runner 1B by looking up a map having the characteristics shown in FIG. 4. This map is stored beforehand in the memory (ROM) of the controller 5.

A target fluid transmission torque calculation unit 105 calculates a target converter transmission torque $t_{CNVC}$ which is equivalent to the target slip rotation speed command value $\omega_{SLPC}$ from the target slip rotation gain $g_{SLPC}$ using the following equation (7):

$$t_{CNVC} = \frac{\omega_{SLPC}}{g_{SLPC}} \quad (7)$$

Figure 5:
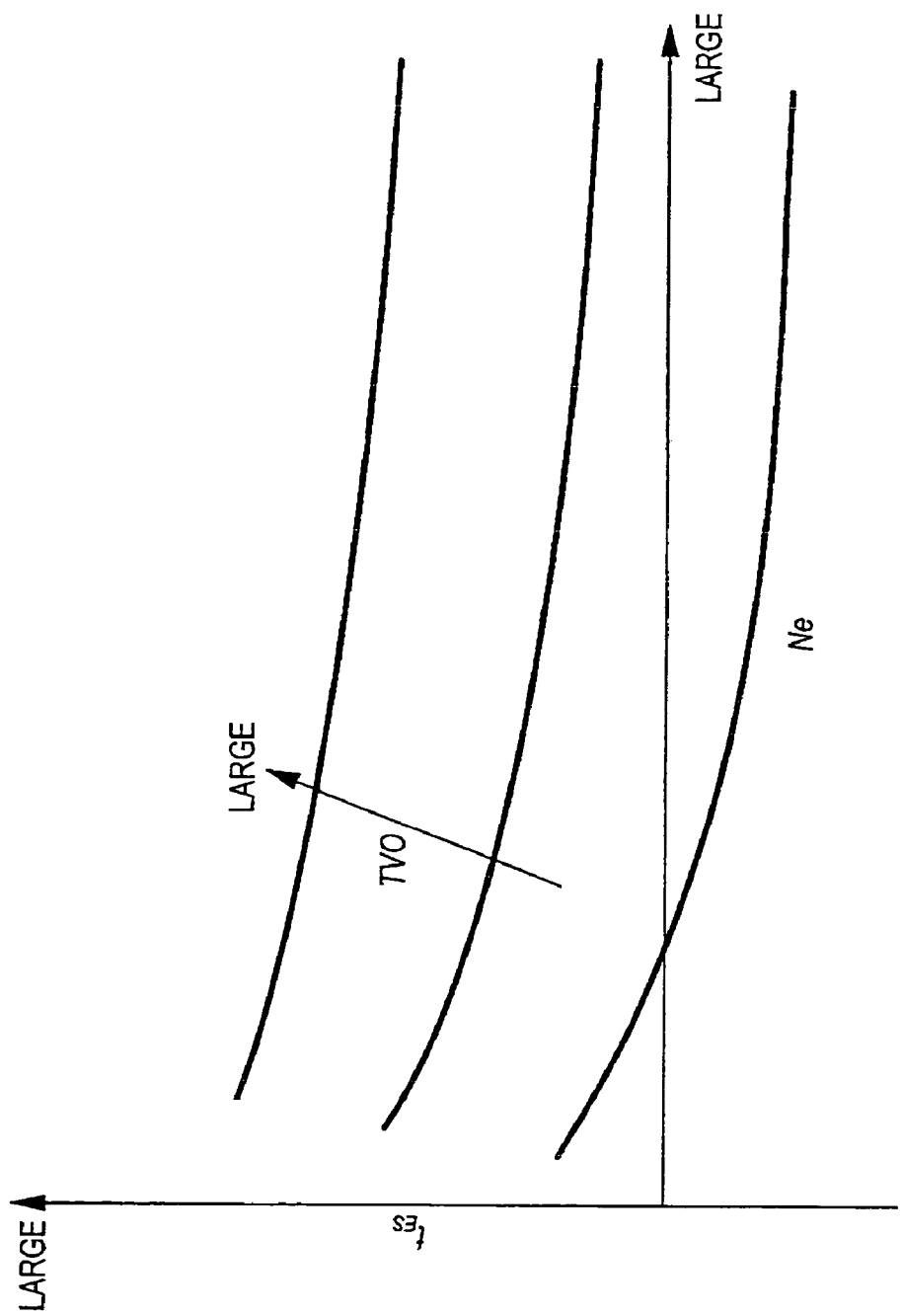
FIG. 5 is a diagram describing the characteristics of a map of an engine output torque $t_{ESC}$ stored by the controller.

An engine output torque estimation unit 108 estimates an output torque $t_{ES}$ of the engine 21 from the engine rotation speed Ne and throttle valve opening TVO by looking up a map having the characteristics shown in FIG. 5. This map is stored beforehand in the memory (ROM) of the controller 5.

This value is then processed by the following equation (8) using a damping time constant $T_{ED}$ which represents the dynamic characteristics of the engine 21, and converted to an engine torque estimation value $t_{EH}$.

$$t_{EH} = \frac{1}{1 + T_{ED} \cdot s} \cdot t_{ES} \quad (8)$$

A target lockup clutch engaging capacity calculation unit 107 subtracts the target fluid transmission torque $t_{CNVC}$ of the equation (7) from the engine output torque estimation value $t_{EH}$ to calculate a target lockup clutch engaging capacity $t_{LUC}$ by the following equation (9).

$$t_{LUC} = t_{EH} - t_{CNVC} \quad (9)$$

Figure 6:
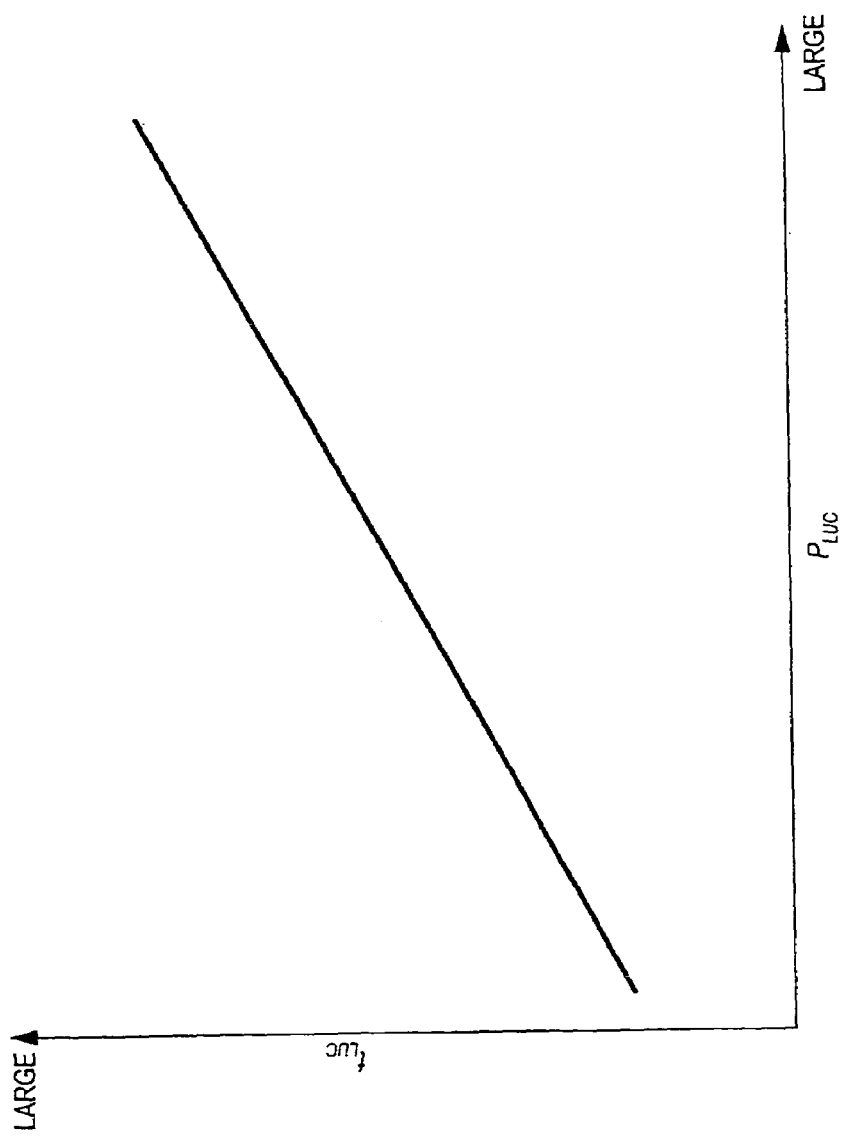
FIG. 6 is a diagram describing the characteristics of a map of a target lockup clutch engaging capacity $t_{LUC}$ stored by the controller.
Figure 7:
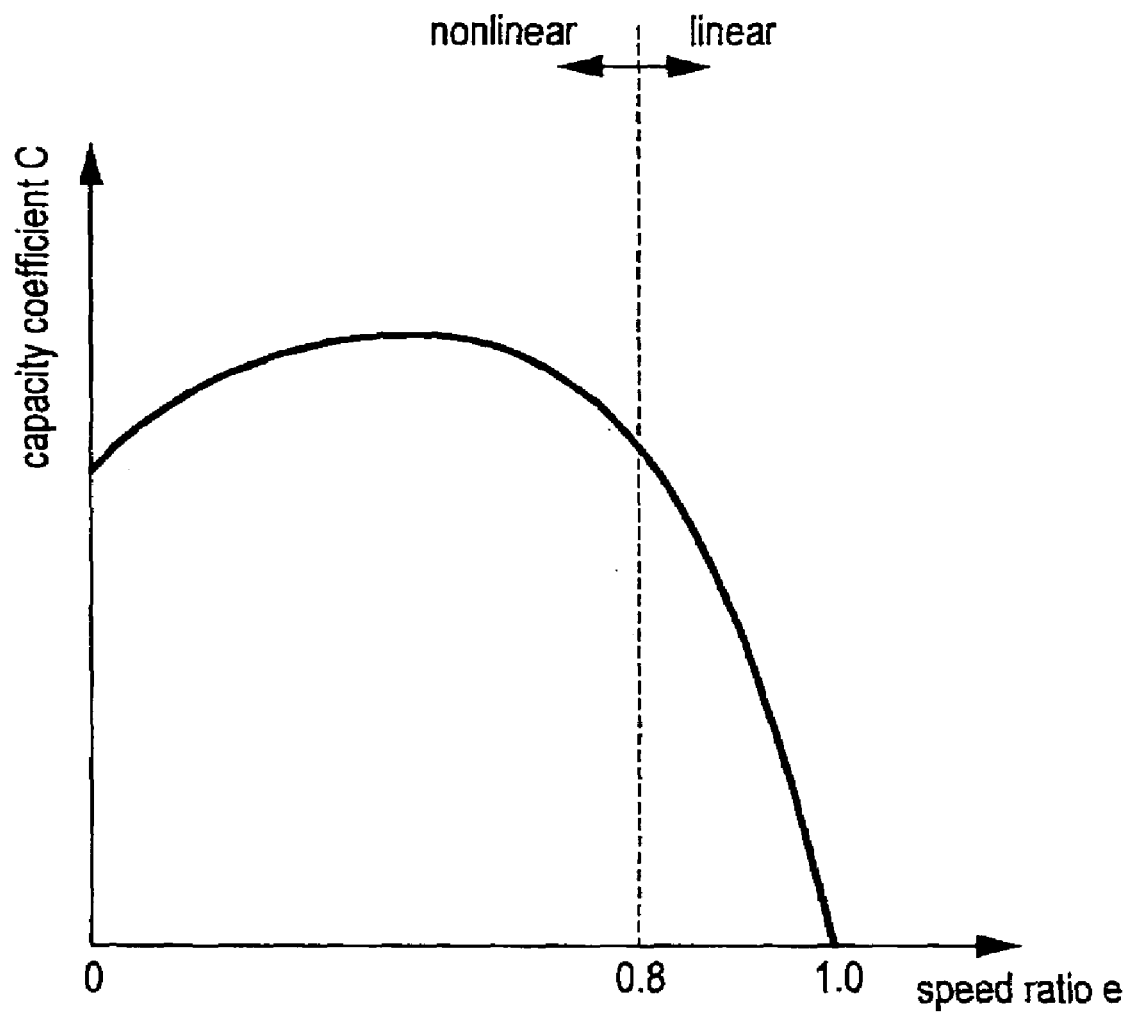
FIG. 7 is a diagram showing a capacity characteristic of the torque converter.

A lockup clutch engaging pressure command value calculation unit 109 calculates a lockup clutch engaging pressure command value $P_{LUC}$ for realizing the target lockup clutch engaging capacity $t_{LUC}$ by looking up a map having the characteristics shown in FIG. 6. This map is calculated beforehand by experiments on the engaging pressure and engaging capacity of the lockup clutch 2, and is stored in the memory (ROM) of the controller 5.

A solenoid drive signal calculation unit 110 calculates a lockup duty based on the lockup clutch engaging pressure command value $P_{LUC}$, and outputs the corresponding duty signal $S_{DUTY}$ to the solenoid valve 4.

Figure 8:
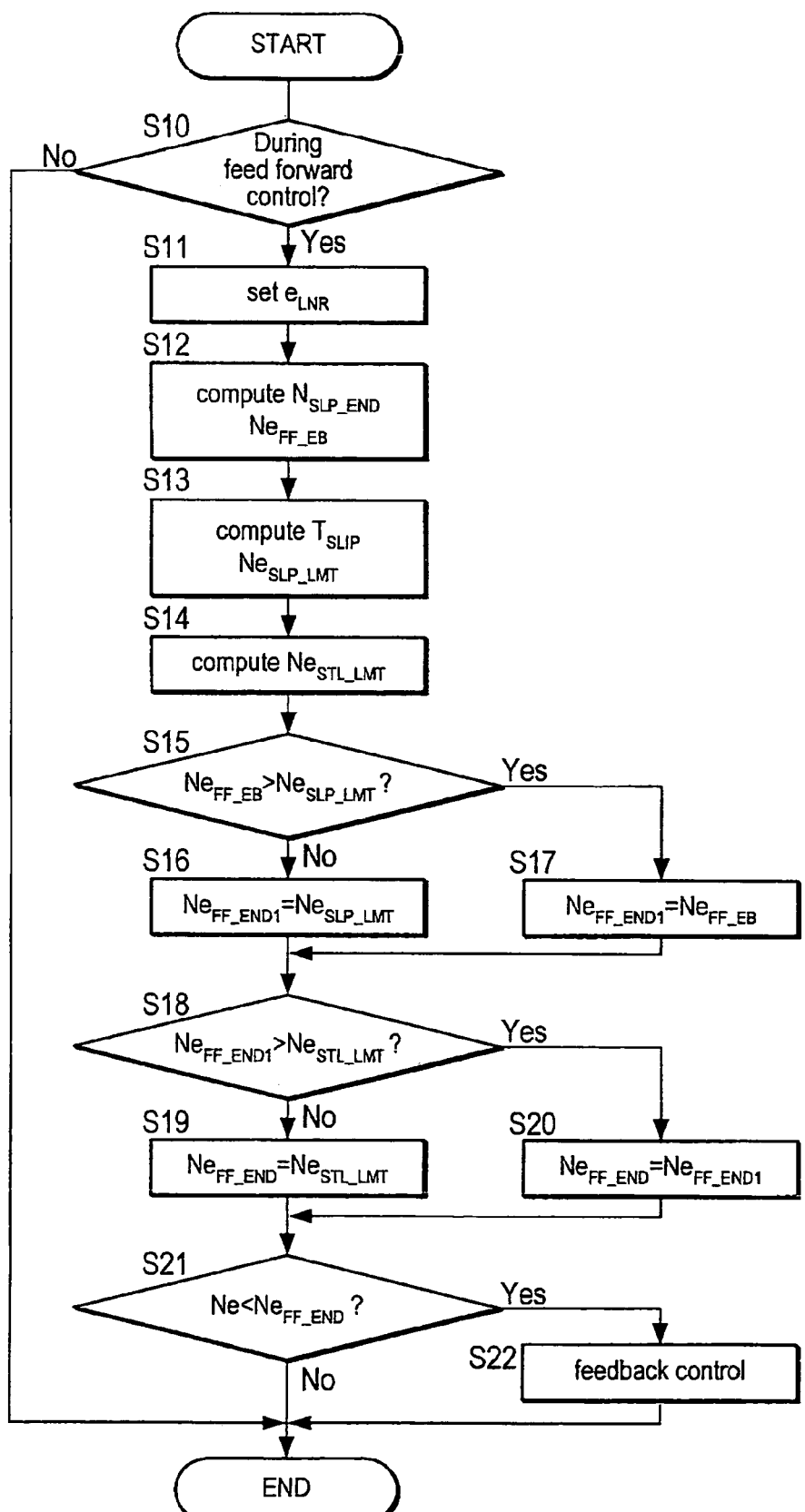
FIG. 8 is a flowchart describing a routine for changing over from feedforward control to feedback control of the slip rotation speed performed by the controller.

Next, referring to the FIG. 8, a routine for changing over from feedforward control to feedback control of the slip rotation speed performed by the controller 5 will be described. This routine illustrates the features of this invention. The controller 5 performs this routine at an interval of 10 milliseconds during vehicle running.

First, in a step S10, the controller 5 determines whether or not the present control state is during feedforward control. If it is during feedforward control, the routine proceeds to a step S11, and if it is not during feedforward control, processing is terminated.

Figure 9:
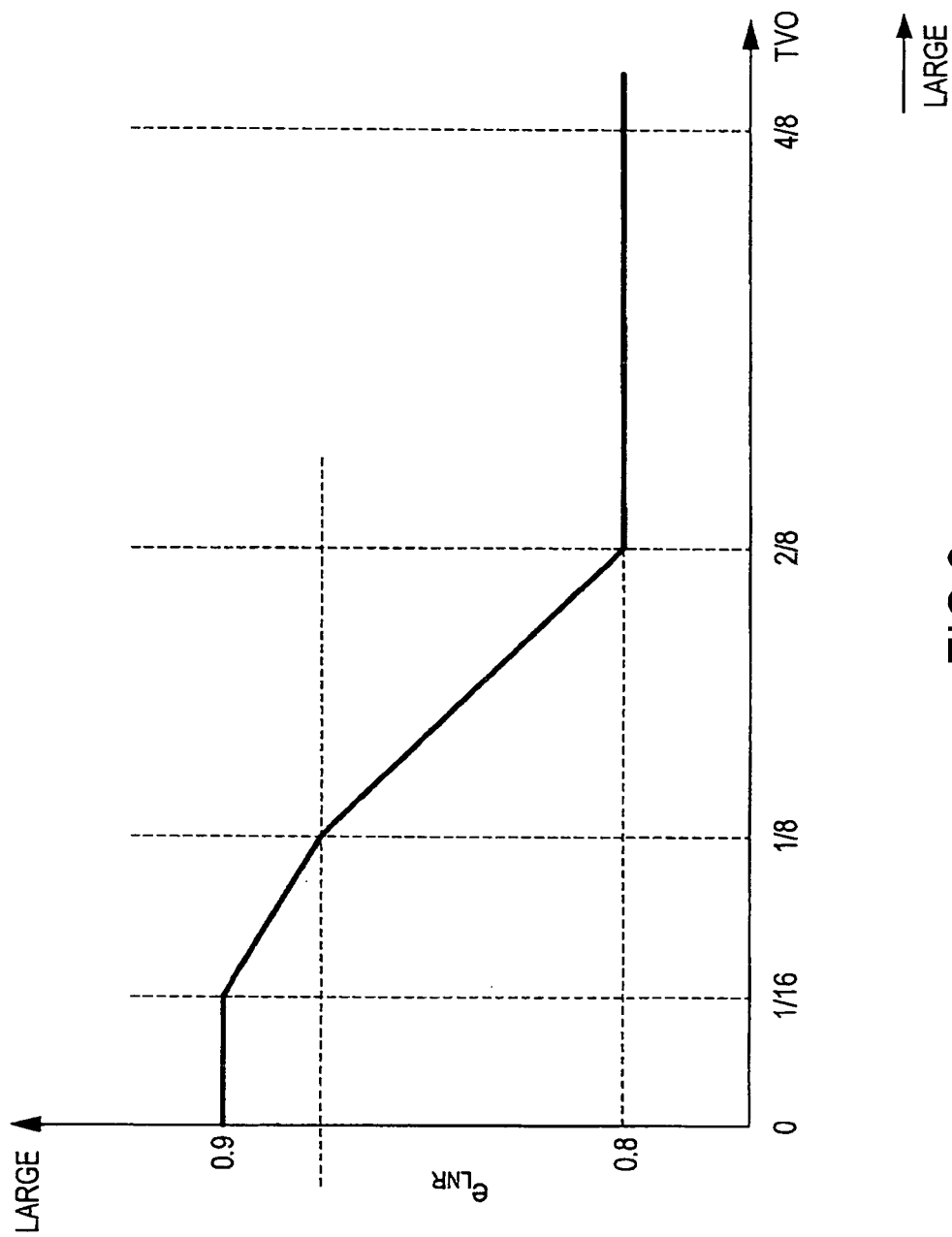
FIG. 9 is a diagram showing the characteristics of a map of a boundary speed ratio $e_{LNR}$ defined according to a throttle valve opening TVO stored by the controller.

In the step S11, the controller 5 sets a boundary speed ratio $e_{LNR}$ which ends feedforward control and starts feedback control. For this setting, a map of the boundary speed ratio $e_{LNR}$ defined according to the throttle valve opening TVO which has the characteristics shown in FIG. 9, is stored beforehand in the ROM of the controller. Based on this map, when the throttle valve opening TVO is larger than $2/8$, the controller 5 sets the boundary speed ratio $e_{LNR}$ to 0.8, and when the throttle valve opening TVO is smaller than $1/16$, the controller 5 sets the boundary speed ratio $e_{LNR}$ to 0.9.

In a next step S12, the controller 5 computes a feedforward control termination slip rotation speed $N_{SLP\_END}$ from the boundary speed ratio $e_{LNR}$ and the present turbine runner rotation speed Nt $(=\omega_{TR})$ based on the following equation (10):

$$N_{SLP\_END} = \frac{Nt \cdot (1 - e_{LNR})}{e_{LNR}} \quad (10)$$

The obtained feedforward control termination slip rotation speed $N_{SLP\_END}$ is converted to a feedforward control termination engine rotation speed $Ne_{FF\_EB}$ based on the following equation (11). This feedforward control termination engine rotation speed $Ne_{SLP\_END}$ corresponds to the reference value of the engine rotation speed in the Claims.

$$Ne_{FF\_EB} = N_{SLP\_END} + Nt \quad (11)$$

Figure 3:
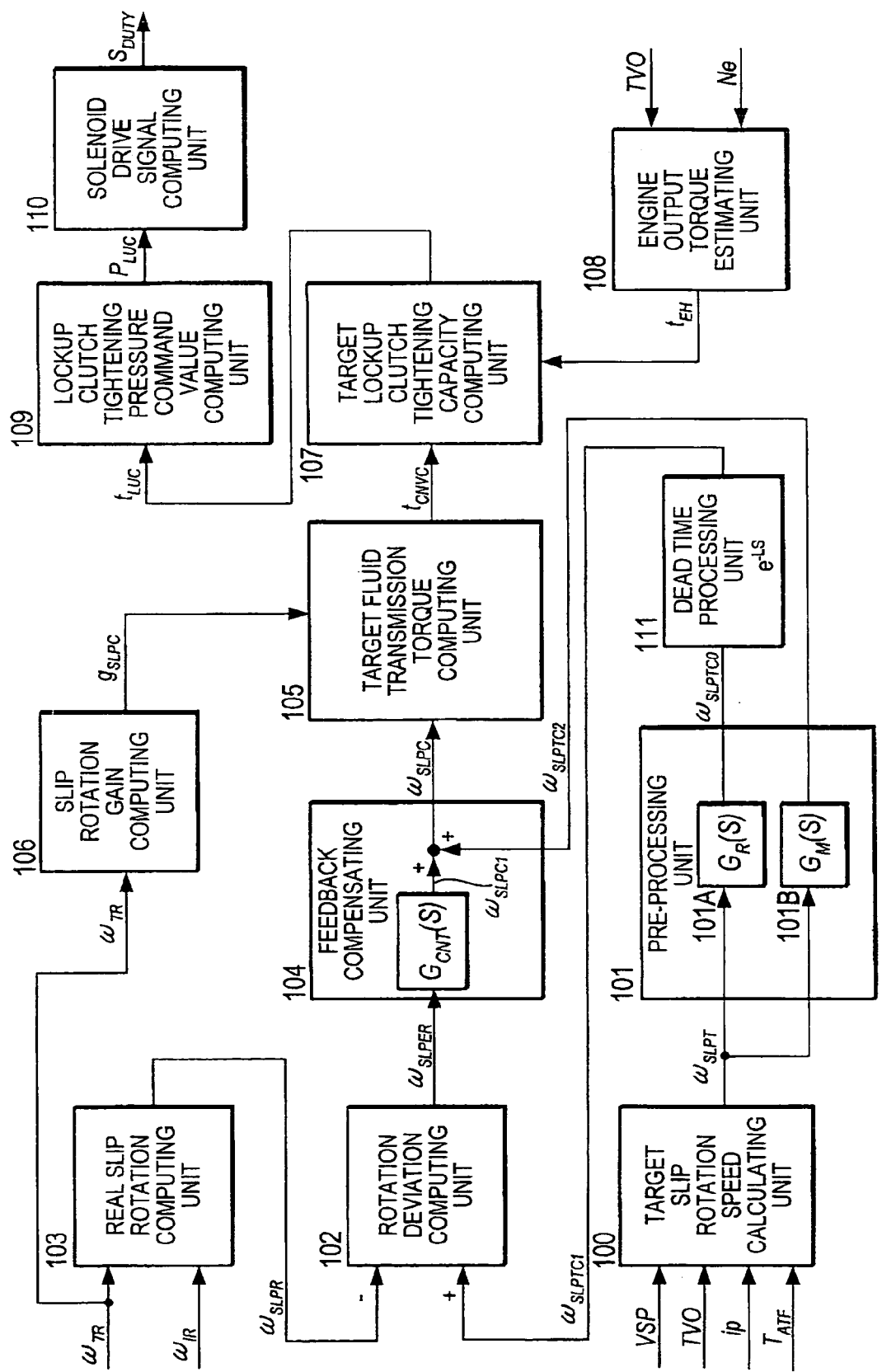
FIG. 3 is a block diagram describing a control function of a controller according to this invention.

In a step S13, the controller 5 determines a target slip rotation speed $T_{SLIP}$ used for feedback control in the same way as the target slip rotation computing unit 100 of FIG. 3. $T_{SLIP}$ is equivalent to $\omega_{SLPT}$ of the target slip rotation computing unit 100 of FIG. 3.

The target engine rotation speed $Ne_0$ is computed by the following equation (12) based on the target slip rotation speed $T_{SLIP}$.

$$Ne_0 = T_{SLIP} + Nt \quad (12)$$

A feedforward control termination engine rotation speed upper limit $Ne_{SLP\_LMT}$ is then computed by the following equation (13), taking account of a slip rotation speed margin $T_{SLIP\_M}$ set beforehand based on the target engine rotation speed $Ne_0$. The feedforward control termination engine rotation speed upper limit $Ne_{SLP\_LMT}$ corresponds to the hunting prevention change-over value in the Claims.

$$Ne_{SLP\_LMT} = Ne_0 + T_{SLIP\_M} \quad (13)$$

The slip rotation speed margin $T_{SLIP\_M}$ may be varied according to the magnitude of the throttle valve opening TVO.

Specifically, when the throttle valve opening TVO is small, the margin $T_{SLIP\_M}$ is set to be large, and when the throttle valve opening TVO is large, the margin $T_{SLIP\_M}$ is set to be small.

In a step S14, the controller 5 computes an engine rotation speed lower limit $Ne_{STL\_LMT}$ based on an engine stall rotation speed $Ne_{STL}$ using the following equation (14), taking account of a margin $Ne_{STL\_M}$ set beforehand. This engine rotation speed lower limit $Ne_{STL\_LMT}$ corresponds to the engine stall prevention change-over value in the Claims.

$$Ne_{STL\_LMT} = Ne_{STL} + Ne_{STL\_M} \quad (14)$$

The margin $T_{SLIP\_M}$ may be varied according to the magnitude of the throttle valve opening TVO.

Specifically, when the throttle valve opening TVO is small, the margin $T_{SLIP\_M}$ is set to be large, and when the throttle valve opening TVO is large, the margin $T_{SLIP\_M}$ is set to be small.

In a step S15, the controller 5 determines whether or not the feedforward control termination engine rotation speed $Ne_{FF\_EB}$ is larger than the feedforward control termination engine rotation speed upper limit $Ne_{SLP\_LMT}$.

When the feedforward control termination engine rotation speed $Ne_{FF\_EB}$ is equal to or less than the upper limit $Ne_{SLP\_LMT}$, the controller 5, in a step S16, sets the upper limit $Ne_{SLP\_LMT}$ as a candidate value $Ne_{FF\_END1}$ for the feedforward control termination engine rotation speed. On the other hand, when $Ne_{FF\_EB}$ is larger than $Ne_{SLP\_LMT}$, the controller 5, in a step S17, sets the feedforward control termination engine rotation speed $Ne_{FF\_EB}$ as the candidate value $Ne_{FF\_END1}$ for the feedforward control termination engine rotation speed.

Next, in a step S18, the controller 5 determines whether or not the candidate value $Ne_{FF\_END1}$ is larger than the lower limit $Ne_{STL\_LMT}$. When the candidate value $Ne_{FF\_END1}$ is equal to or less than the lower limit $Ne_{STL\_LMT}$, the controller 5, in a step S19, sets the lower limit $Ne_{STL\_LMT}$ as the feedforward control termination engine rotation speed final value $Ne_{FF\_END}$. On the other hand, when $Ne_{FF\_END1}$ is larger than the lower limit $Ne_{STL\_LMT}$, the controller 5, in a step S20, sets $Ne_{FF\_END1}$ as the feedforward control termination engine rotation speed final value $Ne_{FF\_END}$.

After determining the feedforward control termination engine rotation speed final value $Ne_{FF\_END}$ as described above, the controller 5, in a step S21, determines whether or not the engine rotation speed Ne is larger than the feedforward control termination engine rotation speed final value $Ne_{FF\_END}$. When the engine rotation speed Ne is equal to or larger than the final value $Ne_{FF\_END}$, the controller 5 maintains the present feedforward control of slip rotation speed as it is, i.e., it terminates the routine without changing over the control. On the other hand, when the engine rotation speed Ne is smaller than the final value $Ne_{FF\_END}$, the controller 5, in a step S22, changes over the present feedforward control of slip rotation speed to the feedback control of FIG. 2. After the processing of step S22, the controller 5 terminates the routine.

Figure 10:
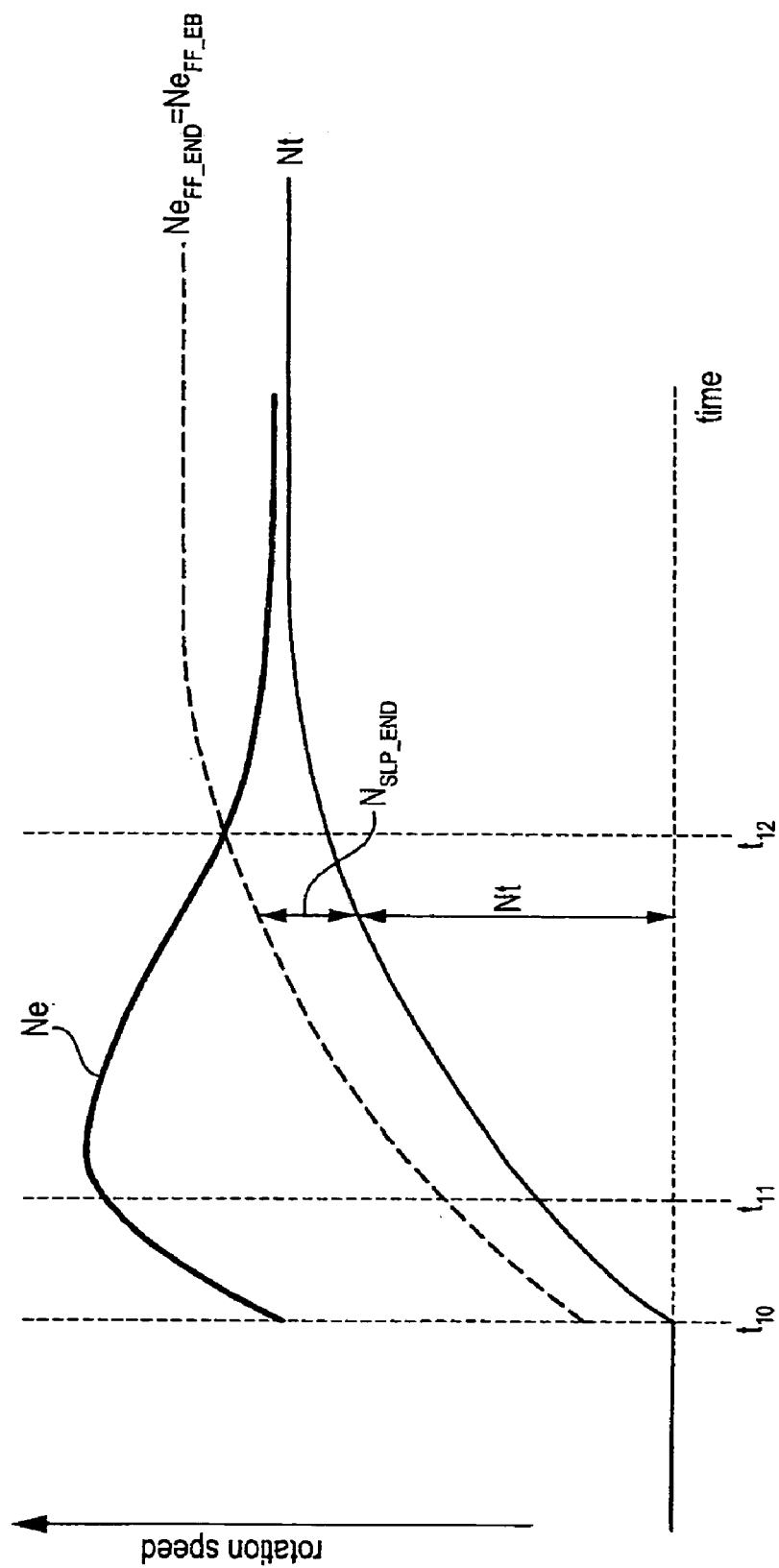
FIG. 10 is a timing chart showing the result of a case where the routine of FIG. 8 is performed, and the determinations of steps S15 and S18 are both affirmative.

Referring to FIG. 10, the change-over from feedforward control to feedback control in the slip mode under the aforesaid change-over routine, will be described.

At a time t10, the vehicle is started. As the vehicle speed increases, the engine rotation speed Ne and turbine runner rotation speed Nt also increase.

At a time t11 when the vehicle speed reaches about 5 km/h, the controller 5 starts feedforward control of the slip rotation speed so that lockup of the lockup clutch 2 begins. Specifically, the lockup differential pressure is increased. As a result, the turbine runner rotation speed Nt increases. On the other hand, the engine rotation speed Ne changes from increase to decrease, and gradually approaches the turbine runner rotation speed Nt.

At a time t12, when the engine rotation speed Ne is less than the feedforward control termination engine rotation speed final value $Ne_{FF\_END}$, the controller 5 determines that the linear region of the torque converter characteristics has been entered, so it terminates feedforward control and changes over to feedback control of the slip rotation speed.

The above situation corresponds to the case where the throttle valve opening TVO is relatively large, and the determination of the step s S15 and S18 is affirmative.

Next, referring to FIG. 11, the case will be described where the throttle valve opening TVO is small, and there is a change-over from feedforward control to feedback control in slip mode.

In such a case, this invention sets the feedforward control termination engine rotation speed final value $Ne_{FF\_END}$ based on the target slip rotation speed $T_{SLIP}$, and when the engine rotation speed Ne is less than $Ne_{FF\_END}$, it changes over from feedforward control to feedback control.

Firstly, in order to better understand the effect of this invention, the case will be described where control is changed over based on the feedforward control termination engine rotation speed $Ne_{FF\_EB}$ without setting the feedforward control termination engine rotation speed final value $Ne_{FF\_END}$.

At a time t20, the vehicle is started. As the vehicle speed increases, the engine rotation speed Ne and turbine runner rotation speed Nt also increase.

At a time t21 when the vehicle speed reaches about 5 km/h, the controller 5 starts feedforward control of the slip rotation speed so that lockup of the lockup clutch 2 begins, and the lockup differential pressure (PA–PR) is increased. As a result, the turbine runner rotation speed Nt increases. On the other hand, the increase of the engine rotation speed Ne is sluggish.

At a time t23 when the engine rotation speed Ne falls below the feedforward control termination engine rotation speed $Ne_{FF\_EB}$, it is determined that the linear region of the torque converter characteristic has been entered, feedforward control is terminated, and there is a change-over to slip rotation speed control by feedback control. At this time, the engine rotation speed Ne is lower than the target engine rotation speed $Ne_0$ of feedback control. If feedback control is performed so that engine rotation speed Ne increases, hunting will occur and the driver will experience an unpleasant feeling.

Thus, when feedforward control is terminated based only on the feedforward control termination engine rotation speed $Ne_{FF\_EB}$, if the engine rotation speed Ne has become smaller than the target engine rotation speed $Ne_0$ of feedback control at the end of feedforward control, hunting of the engine rotation speed Ne occurs when feedback control is applied. This situation occurs easily when the throttle valve opening TVO is small, and gives the driver an unpleasant feeling due to hunting of the engine rotation speed Ne.

In such a case, this invention changes over control based not on the feedforward control termination engine rotation speed $Ne_{FF\_EB}$, but based on the target slip rotation speed $T_{SLIP}$.

Specifically, a value obtained by adding the margin $T_{SLIP\_M}$ to the target engine rotation speed $Ne_0$ for feedback control is taken as the feedforward control termination engine rotation speed final value $Ne_{FF\_END}$, and at a time t22 when the engine rotation speed Ne is less than the end final value $Ne_{FF\_END}$, feedforward control is terminated and there is a change-over to feedback control for slip rotation speed control.

The above situation is equivalent to the case when the determination of the step S15 is negative and the determination of the step S18 is affirmative.

As a result, at the time t22 when feedforward control is terminated, the engine rotation speed Ne is higher than the target engine rotation speed $Ne_0$ of feedback control, so the engine rotation speed Ne can be linked smoothly to the target engine rotation speed $Ne_0$ of feedback control, and hunting of the engine rotation speed can be avoided.

Figure 12:
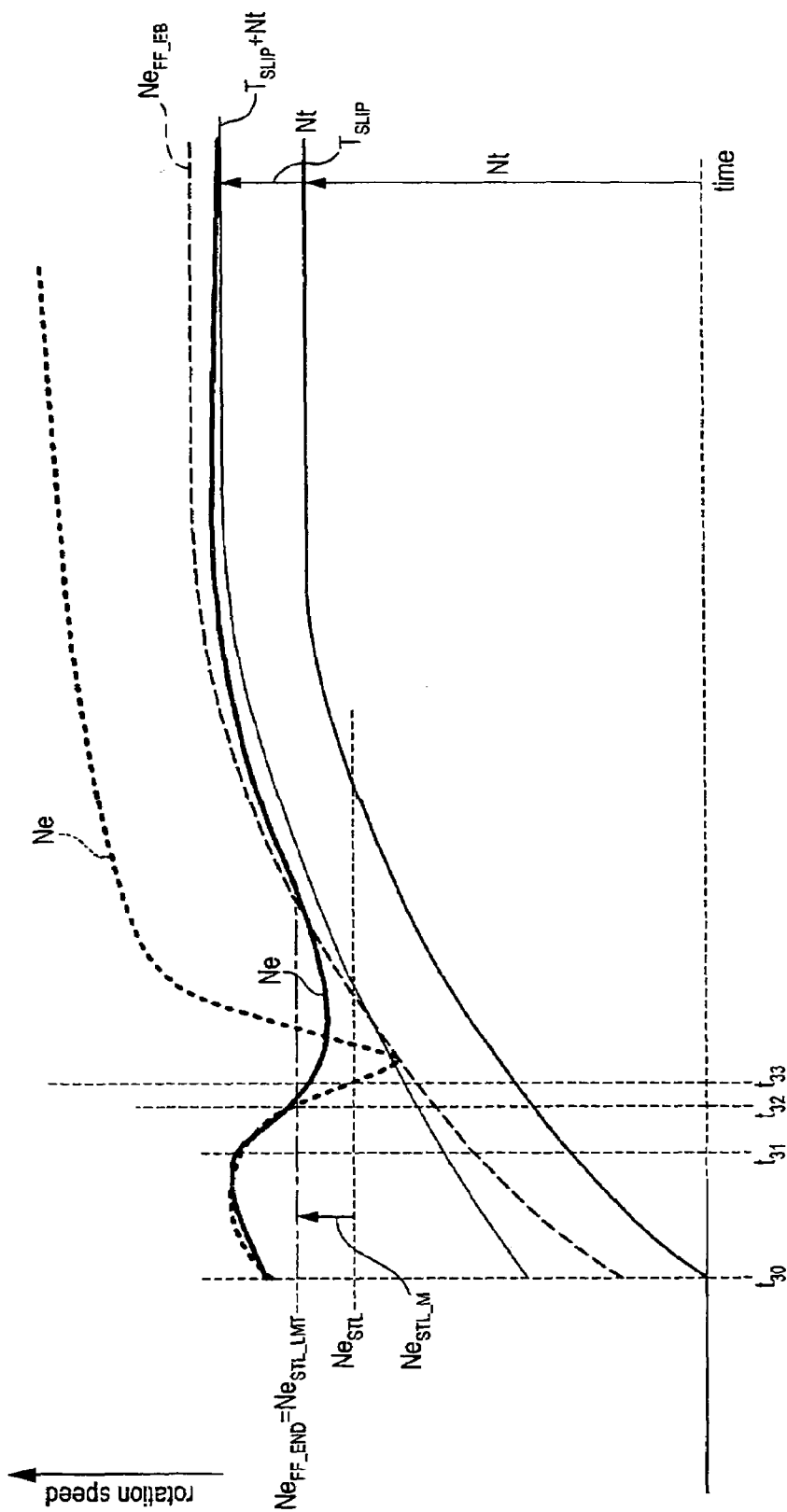
FIG. 12 is a timing chart showing the result of a case where the routine of FIG. 8 is performed, and the determinations of the steps S15 and S18 are both negative.

Referring to FIG. 12, in the case where the throttle valve opening TVO is still smaller and there is a possibility of engine stalling, a change-over from feedforward control to feedback control of the slip rotation speed, will be described.

In such a case, this invention changes over from feedforward control to feedback control based on an engine stall determination engine rotation speed $Ne_{STL}$ for determining the minimum engine rotation speed at which lockup can occur without producing an engine stall.

Firstly, in order to better understand the effect of this invention, the case will be described where control is changed over based on the feedforward control termination engine rotation speed $Ne_{FF\_EB}$ without considering the engine stall rotation speed $Ne_{STL}$.

At a time t30, the vehicle is started. As the vehicle speed increases, the engine rotation speed Ne and turbine runner rotation speed Nt also increase.

At a time t31 when the vehicle speed reaches about 5 km/h, feedforward control of the slip rotation speed is started so that lockup of the lockup clutch 2 begins, and the lockup differential pressure (PA–PR) is increased. As a result, the turbine runner rotation speed Nt increases. On the other hand, the engine rotation speed Ne changes over from increase to decrease.

Since the feedforward control termination engine rotation speed $Ne_{FF\_EB}$ is lower than the engine stall rotation speed $Ne_{STL}$, as shown by the dotted line, at a time t33, the engine rotation speed Ne becomes less than the engine stall rotation speed $Ne_{STL}$ as shown by a thick dotted line in the figure. Hence, to avoid an engine stall, the lockup is released immediately. When this occurs, the engine rotation speed suddenly increases and a shock occurs.

In such a case, this invention changes over control based not on the feedforward control termination engine rotation speed $Ne_{FF\_EB}$, but based on the engine stall rotation speed $Ne_{STL}$.

Specifically, a value obtained by adding the margin $Ne_{STL\_M}$ to the engine stall rotation speed $Ne_{STL}$ is taken as the feedforward control termination engine rotation speed final value $Ne_{FF\_END}$, and at a time t32 when the engine rotation speed Ne becomes less than the feedforward control termination engine rotation speed final value $Ne_{FF\_END}$, feedforward control is terminated and there is a change-over to feedback control for slip rotation speed control.

The above situation is equivalent to the case when the determinations of the step S15 and step 18 are both negative.

As a result, at the time t32 when feedforward control is terminated, the engine rotation speed Ne is higher than the target engine rotation speed $Ne_0$ of feedback control, so the engine rotation speed Ne can be linked smoothly to the target engine rotation speed $Ne_0$ of feedback control, it does not fall below the engine stall engine rotation speed $Ne_{STL}$, and release of lockup does not occur.

As mentioned above, according to this invention, the feedforward control termination slip rotation speed $N_{SLP\_END}$ is determined from the equation (10) based on the boundary speed ratio $e_{LNR}$ which is the boundary between the linear region and nonlinear region of the capacity characteristic of the torque converter, and the feedforward control termination engine rotation speed $Ne_{FF\_EB}$ is computed by adding the turbine runner rotation speed Nt to the feedforward control termination slip rotation speed $N_{SLP\_END}$, as in the equation (11). When the engine rotation speed Ne falls below the feedforward control termination engine rotation speed $Ne_{FF\_EB}$, there is a change-over from feedforward control to feedback control.

Thus, by changing over from feedforward control to feedback control considering the capacity characteristic of the torque converter, feedback control is started when the torque converter characteristic has definitely entered the linear region, the control performance of feedback control can be maintained, and the slip rotation speed can be controlled to the desired value with high precision.

The boundary speed ratio $e_{LNR}$ is set according to the throttle valve opening TVO. When the throttle valve opening TVO is large, since the engine rotation speed increases rapidly, the boundary speed ratio $e_{LNR}$ is set small and the change-over to feedback control is made early.

When the throttle valve opening TVO is small, the boundary speed ratio $e_{LNR}$ is set large, so control performance can be improved. Even if there are variations in the torque converter or change of running conditions, the change-over to feedback control is made only after reducing the slip rotation speed by the pressure of feedforward control, hunting of the engine rotation speed does not easily occur, and control can be changed over smoothly.

Further, the feedforward control termination engine rotation speed upper limit $N_{SLP\_LMT}$ which takes account of the slip rotation speed margin $T_{SLIP\_M}$ is introduced into the target engine rotation speed $Ne_0$, and the change-over from feedforward control to feedback control is based on this upper limit $N_{SLP\_LMT}$. This prevents the feedforward control termination engine rotation speed from becoming too small.

Figure 11:
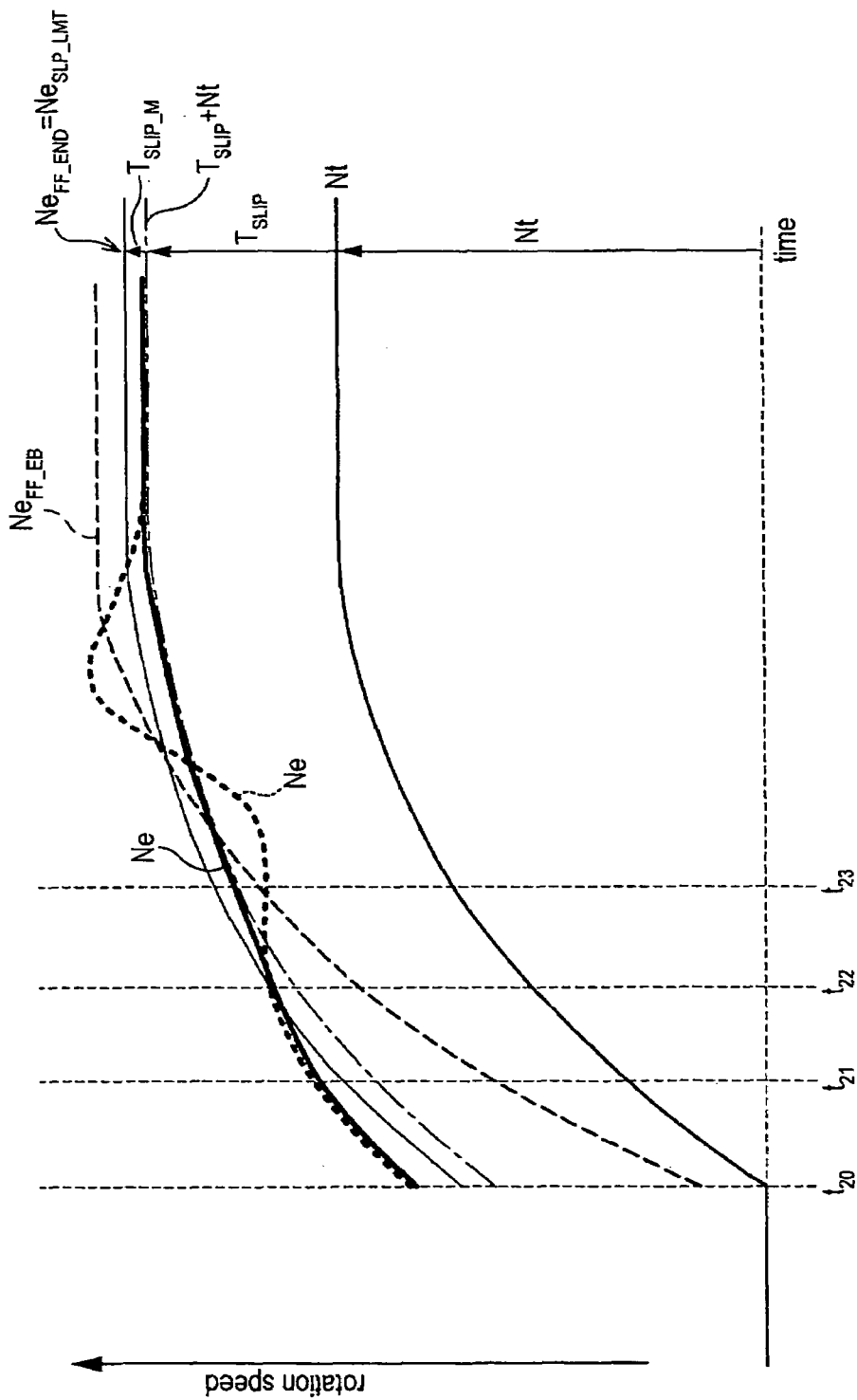
FIG. 11 is a timing chart showing the result of a case where the routine of FIG. 8 is performed, the determination of the step S15 is negative, and the determination of the step 18 is affirmative.

As a result, as shown in FIG. 11, even when the throttle valve opening is small and the feedforward control termination engine rotation speed $Ne_{FF\_EB}$ according to the boundary speed ratio $e_{LNR}$ is smaller than the target engine rotation speed $Ne_0$, the engine rotation speed can shift from feedforward control to feedback control smoothly after feedback control starts without causing hunting.

By setting the slip rotation speed margin $T_{SLIP\_M}$ according to the throttle valve opening TVO, the shift from feedforward control to feedback control can be performed more smoothly.

Also, as shown in FIG. 12, the change-over from feedforward control to feedback control is made while the engine rotation speed Ne is larger than the engine stall rotation speed $Ne_{STL}$. As a result, a rapid increase of engine rotation speed generated by lockup release to avoid engine stall can be prevented, and the change-over from feedforward control to feedback control can be performed smoothly.

The engine rotation speed lower limit $Ne_{STL\_LMT}$ based on the engine stall rotation speed $Ne_{STL}$ is a value obtained by adding the engine rotation speed margin $Ne_{STL\_M}$ to the engine stall rotation speed $Ne_{STL}$. By setting this margin $Ne_{STL\_M}$ according to the magnitude of the throttle valve opening TVO, the shift from feedforward control to feedback control can be performed more smoothly.

The contents of Tokugan 2004-170994, with a filing date of Jun. 9, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, the aforesaid lockup control was described in the context of its application to starting lockup when the vehicle starts, but it may be applied also to lockup accompanying the rise of vehicle speed.

In each of the above an embodiment, the parameters required for control are detected using sensors, but this invention can be applied to any lockup control device which can perform the claimed control using the claimed parameters regardless of how the parameters are acquired.

The embodiments of this invention in which an exclusive property or privilege is claimed are defined as follows:

1. A lockup control device of a lockup clutch of a torque converter for a vehicle, the torque converter comprising a pump impeller connected to an engine and a turbine runner connected to an automatic transmission, and transmitting a torque therebetween via a fluid and via the lockup clutch according to an engaging force of the lockup clutch, the device comprising:
   a mechanism which adjusts the engaging force; and
   a programmable controller programmed to:
      perform feedforward control of the mechanism;
      calculate a target engine rotation speed based on a running state of the engine;
      compute a reference value related to a rotation speed of the engine based on a capacity characteristics of the torque converter;
      perform, when the rotation speed of the engine falls to less than the reference value during feedforward control, a change-over from feedforward control of the mechanism to feedback control of the mechanism in which a deviation of the rotation speed of the engine from the target engine rotation speed is reduced; and
      perform, when a predetermined condition is satisfied, even if the rotation speed of the engine has not fallen to less than the reference value, perform a change-over from feedforward control of the mechanism to feedback control of the mechanism.

2. The lockup control device as defined in claim 1, wherein
   the controller is further programmed to compute a hunting prevention change-over value based on the target engine rotation speed, and when the rotation speed of the engine becomes less than the hunting prevention change-over value, determine that the predetermined condition is satisfied.

3. The lockup control device as defined in claim 2, wherein
   the controller is further programmed to compute an engine stall prevention change-over value based on a minimum rotation speed of the engine at which lockup can be performed without stalling the engine, and when the rotation speed of the engine is less than the maximum value among the reference value, the hunting prevention change-over value and the engine stall prevention change-over value, determine that the predetermined condition is satisfied.

4. The lockup control device as defined in claim 3, wherein
   the engine comprises a throttle to regulate an output power, and
   the engine stall prevention change-over value is set to be small when the throttle opening is large, and set to be large when the throttle opening is small.

5. The lockup control device as defined in claim 2, wherein
the engine comprises a throttle to regulate an output power, and
the hunting prevention change-over value is set to be small when a throttle opening is large, and set to be large when the throttle opening is small.

6. The lockup control device as defined in claim 1, wherein
the controller is further programmed to compute an engine stall prevention change-over value based on a minimum rotation speed of the engine at which lockup can be performed without stalling the engine, and when the rotation speed of the engine is less than the engine stall prevention change-over value, determine that the predetermined condition is satisfied.

7. The lockup control device as defined in claim 1, wherein
the engine comprises a throttle to regulate an output power, and
the reference value is set to be large when a throttle opening is large, and set to be small when the throttle opening is small.

8. The lockup control device as defined in claim 1, wherein
the reference value is computed based on a boundary speed ratio when a speed ratio, which is a ratio of a turbine runner rotation speed to a rotation speed of the engine, changes from a non-linear relation to a linear relation with respect to capacity coefficient of the torque converter.

9. A lockup control device of a lockup clutch of a torque converter for a vehicle, the torque converter comprising a pump impeller connected to an engine and a turbine runner connected to an automatic transmission, and transmitting a torque therebetween via a fluid and the lockup clutch according to an engaging force of the lockup clutch, the device comprising:
means for adjusting the engaging force;
means for performing feedforward control of the adjusting means;
means for calculating a target engine rotation speed based on a running state of the engine;
means for computing a reference value related to a rotation speed of the engine based on a capacity characteristic of the torque converter;
means for performing, when the rotation speed of the engine falls to less than the reference value during feedforward control, a change-over from feedforward control of the adjusting means to feedback control of the adjusting means in which the deviation of the rotation speed of the engine from the target engine rotation speed is reduced; and
means for performing, when a predetermined condition is satisfied, even if the rotation speed of the engine has not fallen to less than the reference value, a change-over from feedforward control of the adjusting means to feedback control of the mechanism.

10. A lockup control method of a lockup clutch of a torque converter for a vehicle, the torque converter comprising a pump impeller connected to an engine and a turbine runner connected to an automatic transmission, and transmitting a torque therebetween via a fluid and the lockup clutch according to an engaging force of the lockup clutch which is adjusted by an engaging force adjusting mechanism, the method comprising:
performing feedforward control of the mechanism;
calculating a target engine rotation speed based on a running state of the engine;
computing a reference value related to a rotation speed of the engine based on a capacity characteristic of the torque converter;
performing, when the rotation speed of the engine falls to less than the reference value during feedforward control, a change-over from feedforward control of the mechanism to feedback control of the mechanism in which the deviation of the rotation speed of the engine from the target engine rotation speed is reduced; and
performing, when a predetermined condition is satisfied, even if the rotation speed of the engine has not fallen to less than the reference value, a change-over from feedforward control of the mechanism to feedback control of the mechanism.

* * * * *